United States Patent [19]

Okuno

[11] Patent Number: 5,188,480
[45] Date of Patent: Feb. 23, 1993

[54] COUPLING FIXTURE

[76] Inventor: Toshikazu Okuno, 5-10, 1-chome, Chihara-cho, Izumiohtsu-shi, Osaka, Japan

[21] Appl. No.: 692,467

[22] Filed: Apr. 22, 1991

[30] Foreign Application Priority Data

Jun. 28, 1990 [JP] Japan ................ 2-68995[U]

[51] Int. Cl.⁵ .............................................. F16B 2/14
[52] U.S. Cl. ...................................... 403/369; 403/370; 403/371
[58] Field of Search ................ 403/371, 370, 369, 16

[56] References Cited

U.S. PATENT DOCUMENTS

| Re. 27,954 | 4/1974 | Kelly | 403/369 |
| 1,050,345 | 1/1913 | Conrad | 403/369 X |
| 3,009,747 | 11/1961 | Pitzer | 403/371 X |
| 3,720,429 | 3/1973 | Friedrichs et al. | 403/371 X |
| 4,475,842 | 10/1984 | Onaya et al. | 403/371 X |

FOREIGN PATENT DOCUMENTS

| 91096 | 6/1961 | Denmark | 403/372 |
| 1194652 | 6/1965 | Fed. Rep. of Germany | 403/370 |
| 2142453 | 3/1973 | Fed. Rep. of Germany | 403/370 |
| 3716138 | 11/1988 | Fed. Rep. of Germany | 403/370 |
| 2207488 | 2/1989 | United Kingdom | 403/370 |

Primary Examiner—Randolph A. Reese
Assistant Examiner—Heather Chun
Attorney, Agent, or Firm—Stevens, Davis, Miller & Mosher

[57] ABSTRACT

A coupling fixture provided with an outer ring and an inner ring each ring having a radially extending cut in one circumferential direction, the inner periphery of the outer ring and the outer ring of the inner periphery being tapered, a wedge-like-shaped ring nut interposed between the inner periphery and the outer periphery, and screw bolts screwably engageable with the ring nut to expand the outer ring in diameter and contract the inner ring in diameter, the ring nut being provided with a cut for making the ring nut radially displaceable.

2 Claims, 4 Drawing Sheets

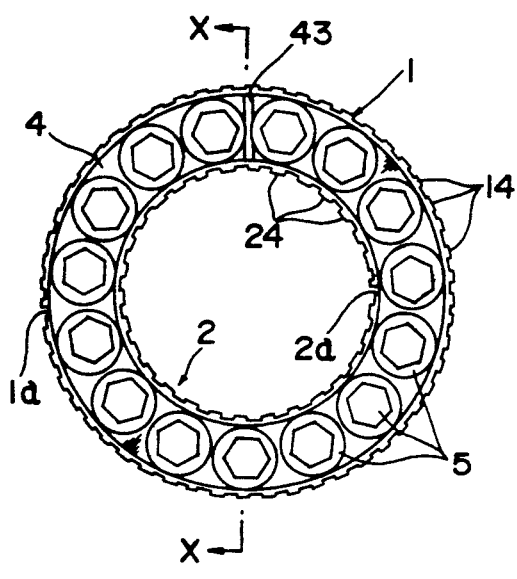
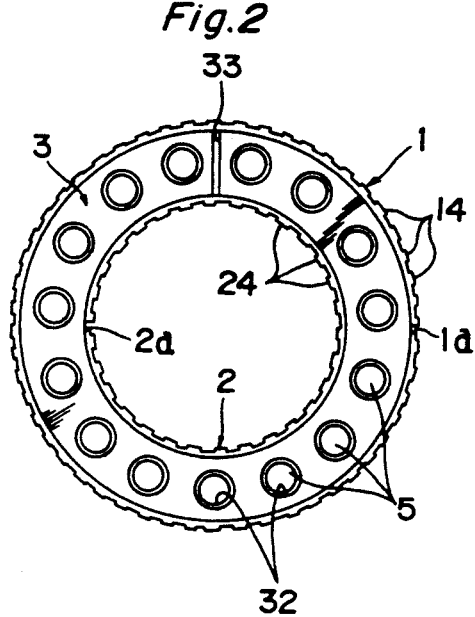
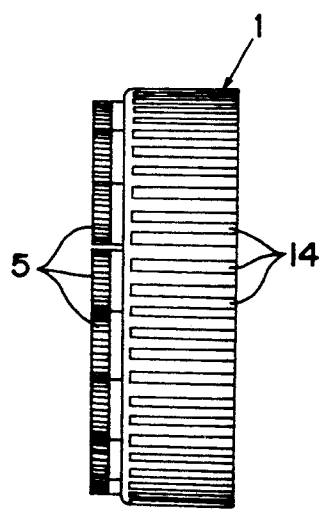

COUPLING FIXTURE

BACKGROUND OF THE INVENTION

1. Field of the Invention

This invention relates to a coupling fixture to fix a coupling member, such as a gear, mainly to a shaft member.

2. Description of the Prior Art

Conventionally, this kind of coupling fixture, as shown in FIG. 12, has an outer ring and an inner ring B each having a cut and is provided at the inner peripheral surface of the outer ring A and at both axial sides thereof with tapered surfaces T1 and T2, at the outer peripheral surface of the inner ring B at both axial sides thereof with tapered surfaces T3 and T4 opposite to surfaces T1 and T2 respectively, between the outer ring and the inner ring B and at one axial side with an annular ring nut C interposed therebetween and having the inner and outer peripheries tapered surfaces T5 abutting against the tapered surfaces T1 and T3 and circumferentially continuing, between the outer ring and the inner ring B and at the other axial side with an annular washer D interposed therebetween and having tapered surfaces T6 abutting against the tapered surfaces T2 and T4 respectively and circumferentially continuing, and across the ring nut C and ring washer D with a screwbolt E for tightening them.

When the coupling fixture is used to couple a gear G with a shaft F, the outer ring A and inner ring B are interposed between the inner surface of a cutout g provided at one axial side of the inner periphery of the gear G and the outer surface of the shaft F, so that the screw bolt E is screwably tightened to move the ring nut C and ring washer D in the direction of approaching to each other, and the tapered surfaces T5 and T6 of ring nut C and ring washer urge the tapered surfaces T1 and T3 and T2 and T4 of the outer and inner rings A and B respectively, whereby the outer ring A is expanded in diameter so as to be brought into press-contact with the inner surface of the cutout g and the inner ring B is contracted in diameter to be brought into press-contact with the outer surface of the shaft F so as to integrally couple the gear G with the shaft F.

In this coupling fixture, the ring nut C and ring washer D are circumferentially continuously annular, whereby when the shaft F or the gear G has a manufacturing error, they are not rigidly coupled with each other and thus result in unstable coupling. In other words, for example, when the diameter of shaft F is smaller than a predetermind size, the screw bolt E is tightened so that an urging force caused by the ring nut C and ring washer D brings the outer ring A into rigid press-contact with the inner surface of the cutout g of the gear G. On the other hand, in spite of the fact that inner ring B is subjected to the same urging force as that applied to the ring washer C, because the shaft F is smaller in diameter the result is not to bring the inner ring B into rigid press-contact with the outer surface of the shaft F, thereby producing a difference in the urging force between the outer ring A and the inner ring b. As a result, a problem is created in that the coupling of the gear G with the shaft F by the outer and inner rings A and B becomes unstable.

SUMMARY OF THE INVENTION

In light of the above problem, the present invention has been designed. An object thereof is to provide a coupling fixture which, even when the shaft or the gear may have a manufacturing error, the invention can rigidly and stably couple the gear with the shaft.

The present invention is characterized in that in the coupling fixture for coupling a coupled member mainly to a shaft, comprises: an outer ring having an inner peripheral surface and an outer peripheral surface and being provided with a tapered surface at the inner peripheral surface and a cut in the circumferential direction; an inner ring having an inner peripheral surface and an outer peripheral surface and provided with a tapered surface at the outer peripheral surface and a cut in the circumferential direction; a wedge-like-shaped ring nut to be interposed between the inner peripheral surface of the outer ring and the outer peripheral surface of the inner ring and having tapered surfaces abutting against the above-mentioned tapered surfaces and a plurality of threaded bores circumferentially disposed, and screw bolts screwable with the threaded bores at the ring nut respectively so as to enter the ring nut into between the inner peripheral surface of the outer ring and the outer peripheral surface of the inner ring, thereby expanding the outer ring in diameter and contracting the inner ring in diameter; the ring nut is provided with a cut for making the ring nut radially displaceable when screwed with the screw bolts to enter between the outer ring and the inner ring.

Also, present invention is further characterized in that the coupling fixture is provided with splines at the outer peripheral surface of the outer ring and the inner peripheral surface of the inner ring.

In the above mentioned construction, the screw bolts are screwably tightened to axially move the ring nut so that the outer ring is expanded in diameter and the inner ring contracted in diameter, whereby the gear and shaft are coupled with each other through the outer and inner rings. Even when there is a manufacturing error in the gear or the shaft, since the ring nut is provided with a cut so as to be radially displaceable, the gear is rigidly coupled with the shaft. In other words, for example, in a case where a diameter of the shaft is smaller than a predetermined size, even though an urging force caused by screwably tightening the screw bolts may expand only the outer ring in diameter to be brought into press-contact with the gear, the screw bolts are further continuously screwably tightened so that the ring nut having the cut is radially inwardly displaced on the basis of the outer ring expanded in diameter to be in press-contact with the inner periphery of the cutout at the gear, in other words, the ring nut is contracted in diameter. Accordingly, such contraction in diameter of ring nut applies to the inner ring the urging force caused by screwably tightening the screw bolts, whereby the inner ring is contracted in diameter. As a result, the inner ring is brought into rigid press-contact with the shaft. Hence, the gear is rigidly stably coupled with the shaft without causing a difference in the urging force between the outer ring and the inner ring.

Also, the splines, which are formed at the outer periphery of the outer ring and the inner periphery of the inner ring, reliably prevent the outer and inner rings from slipping with respect to the gear or the shaft. Hence, the gear and shaft are further rigidly coupled with each other.

The above and further objects and novel features of the invention will more fully appear from the following detailed description when the same is read in connection with the accompanying drawings.

BRIEF DESCRIPTION OF THE DRAWINGS

FIG. 1 is a front view of a first embodiment of a coupling fixture of the invention, FIG. 2 is a rear view thereof, FIG. 3 is a side view of the same.

DETAILED DESCRIPTION OF THE PREFERRED EMBODIMENT

Figure 4:
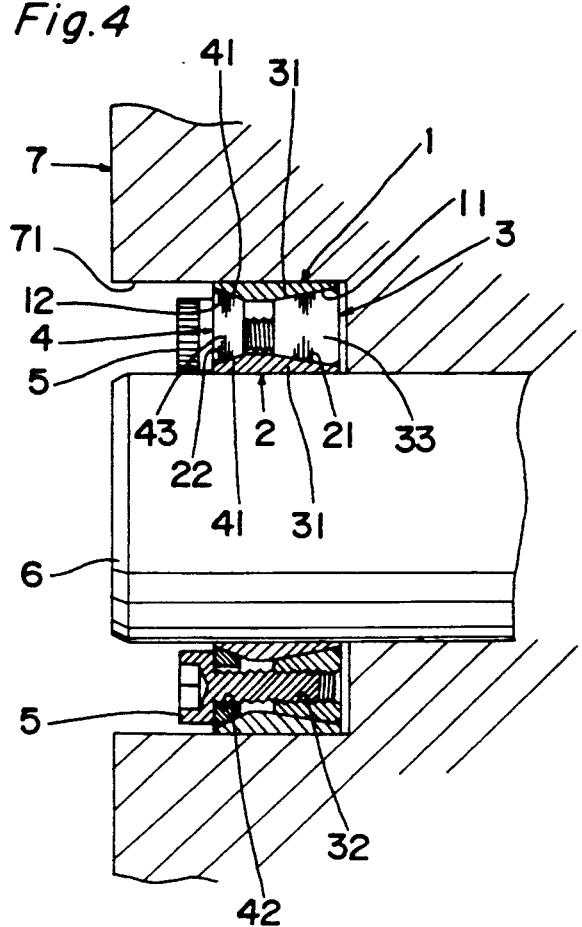
FIG. 4 is a longitudinally sectional view taken on the line X—X in FIG. 1, when the coupling fixture is used.

The first embodiment of the coupling fixture of the invention shown in FIGS. 1 through 4 is provided with a cylindrical outer ring 1 having the inner peripheral surface and the outer peripheral surface and provided at one circumferential side with a cut 1a so as to be substantially C-like-shaped and a cylindrical inner ring 2 having an inner peripheral surface and provided at one circumferential side with a cut 2a so as to be substantially C-like-shaped, the outer ring 1 being provided at one axial side of the inner periphery with a first tapered surface 11 which becomes larger in diameter at the inner periphery thereof toward one open end as shown in FIG. 4 and at the other axial side with a second tapered surface 12 which becomes larger in diameter at the inner periphery thereof toward the other end. The inner ring 2 is provided at one axial side of the outer periphery with a third tapered surface 21 opposite to the first tapered surface 11 and becomes smaller in diameter at the outer periphery thereof toward one open end and at the other axial side with a fourth tapered surface 22 opposite to the second tapered surface 12 and becomes smaller in diameter at the outer periphery of the same toward the other open end.

Figure 5:
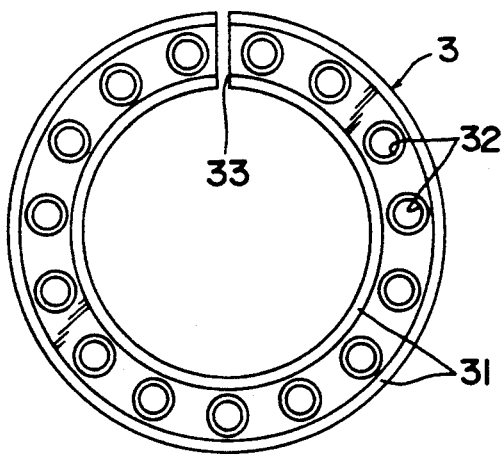
FIG. 5 is a front view of a ring nut at the same.
Figure 6:
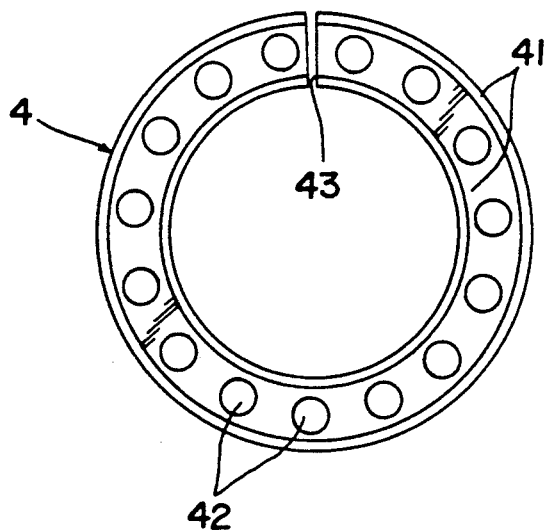
FIG. 6 is a front view of a ring washer at the same.
Figure 7:
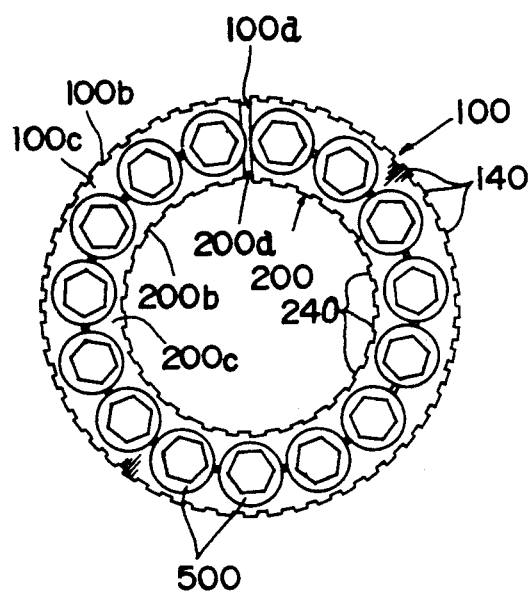
FIG. 7 is a front view of a second embodiment of a coupling fixture of the invention.

At one axial side between the outer ring 1 and the inner ring 2 is interposed a ring nut 3 (see FIG. 5) to be discussed below having tapered surfaces 31 abutting against the first and third tapered surfaces 11 and 21 respectively, a plurality of threaded bores 32 are formed circumferentially of the ring nut 3, an annular ring washer 4 (see FIG. 6) having at its inner and outer peripheries tapered surfaces 41 abutting against the second and fourth tapered surfaces 12 and 22 respectively, is interposed at the other axial side between the outer and inner rings, a plurality of through bores 42 opposite to the threaded bores 32 respectively are provided at the ring washer 4 circumferentially thereof, and screw bolts 5 for tightening are screwed into the threaded bores 32 through the through bores 42 respectively.

The coupling fixture, as shown in FIG. 4, is used, for example, when a gear 7 is coupled with a shaft 6, so that when the gear 7 is coupled therewith, the outer ring 1 and inner ring 2 are interposed between the inner surface of a cutout 71 provided at the center of one side surface of gear 7, in such a manner that the screw bolts 5 are screwably tightened respectively to move the ring nut 3 and ring washer 4 toward each other, and the tapered surfaces 31 and 41 thereof urge the tapered surfaces 11 and 22 of the outer and inner rings 1 and 2, so that the outer ring 1 is expanded in diameter and brought into press-contact with the inner surface of the cutout 71 at the gear and the inner ring 2 is contracted in diameter to be brought into press-contact with the outer surface of the shaft 6, thereby integrally coupling the gear 7 with the shaft 6 through the outer and inner rings 1 and 2.

In the above-mentioned construction, as seen from FIGS. 1, 2, 4, 5, and 6, the ring nut 3 and ring washer 4 are radially cut at a circumferentially position so as to form cuts 33 and 43 making both the ring nut 3 and ring washer 4 radially displaceable respectively.

In a case where the coupling fixture couples the gear 7 with the shaft 6, even when the shaft 6 or 7 includes a manufacturing error, for example, the inner surface 71 of the gear 7 is of a diameter larger than a predetermined size or the shaft 6 is smaller in diameter than a predetermined size, the gear 7 can still be exactly and rigidly coupled with the shaft 6. In other words, the ring nut 3 and ring washer 4 are moved toward each other as the screw bolts 5 are screwably tightened, whereby the outer ring 1 is expanded in diameter and brought into press-contact with the inner surface of the cutout 71. Thereafter the screw bolts 5 further continue screwable tightening to allow the ring nut 3 and ring washer 4 provided with the cuts 33 and 43 to be displaced radially inwardly on the basis of the outer ring, in other words, to be contracted in diameter respectively. Accordingly, such contracton in diameters applies to the inner ring 2 and urging force caused by tightening the screw bolts so that the inner ring 2 can be contracted in diameter by the urging force. As a result, the inner ring 2 is rigidly brought into press-contact with the shaft 6, whereby in comparison with the conventional example of merely moving the ring nut 3 and ring washer 4, the coupling fixture of the present invention couples the gear 7 stably and rigidly with the shaft 6 without producing a difference in the urging force between the outer ring 1 and the inner ring 2.

In the above-mentioned first embodiment, the ring nut 3 and ring washer 4 are interposed between the outer ring 1 and the inner ring 2, and the screw bolts 5 are tightened to move both the ring nut 3 and ring washer 4 toward each other so as to expand the outer ring 1 in diameter, and thereafter the ring nut 3 and ring washer 4 are contracted in diameter so as to contract the inner ring 2 in diameter, thereby coupling the gear 7 with the shaft 6, but the present invention is applicable to a coupling fixture in which only the ring nut 3 is used to integrally couple the gear 7 with the shaft 6.

In detail, in the second embodiment shown in FIGS. 7 through 10, an outer ring 100 comprises a cylindrical peripheral wall 100b and a side wall 100c extending radially inwardly from one lengthwise end of the wall 100b, the peripheral wall 100b and side wall 100c being partially cut-away to from a cut 100a, and an inner ring 200 comprises a cylindrical, peripheral wall 200b and a side wall 200c extending radially outwardly from the position at the peripheral wall 200b opposite to the side wall 100c, the peripheral wall 200b and side wall 200c being partial to form a cut 200a. At the inner periphery of the outer ring 100 is formed a first tapered surface 130 which becomes larger in diameter at the inner periphery of the wall 100 toward the open side therefrom, at the outer periphery of the inner ring 200 is formed a second tapered surface 230 becoming smaller in diameter at the outer periphery of wall 200 toward the open side therefrom, and at the inner and outer edges of side walls 100c and 200c are provided a plurality of semicircular cutouts opposite to each other, thereby forming therewith through-bores 500a for screw bolts 500 respectively.

Between the outer ring 100 and inner ring 200 is interposed a ring nut 300 of a wedge-like-shape in section and having at the inner and outer surfaces tapered surface 340 abutting against the first and second tapered surfaces 130 and 230 respectively, and a plurality of threaded bores 320 opposite to the through bores 500a respectively are formed in the ring nut 300 at circumferentially spaced positions thereof.

The screw bolts 500 are screwably inserted into the threaded bores 320 of the ring nut 300 through the through-bores 500a respectively. While the ring nut 300 is being moved axially inwardly of the outer and inner rings 100 and 200, the tapered surfaces 340 of ring nut 300 urge the tapered surfaces 130 and 230 of the outer and inner rings 100 and 200, so that the outer ring 100 is expanded in diameter and the inner ring 200 is contracted in diameter, thereby integrally coupling the gear 7 with the shaft 6 in the manner same as in the first embodiment.

Figure 8:
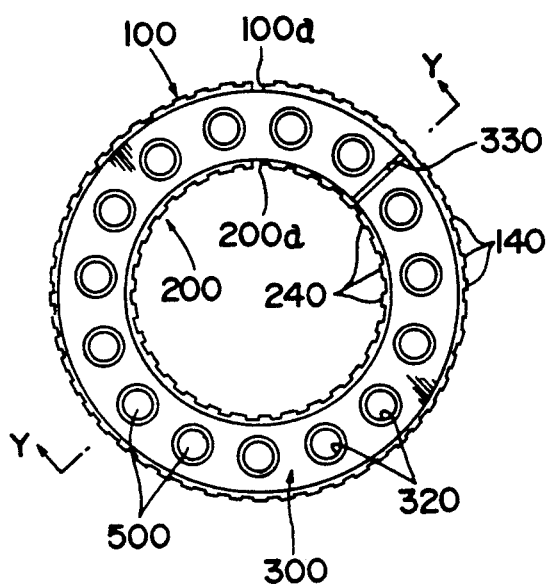
FIG. 8 is a rear view thereof.
Figure 9:
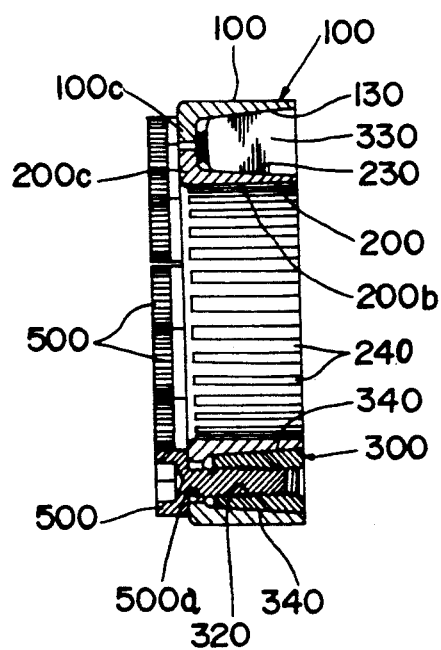
FIG. 9 is a longitudinally sectional view taken on the line Y—Y in FIG. 8.
Figure 10:
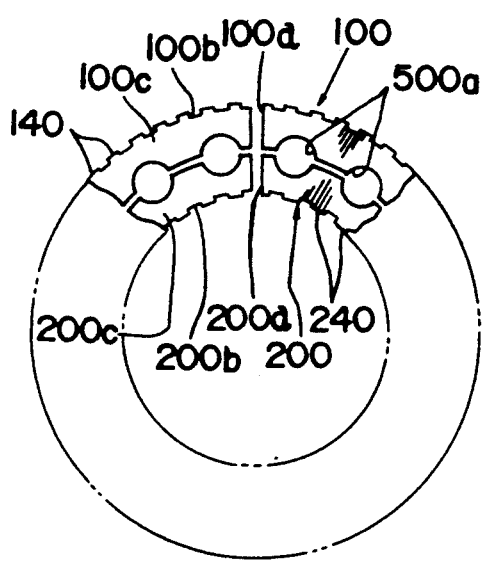
FIG. 10 is a partly omitted view of an outer ring and an inner ring of the same.
Figure 11:
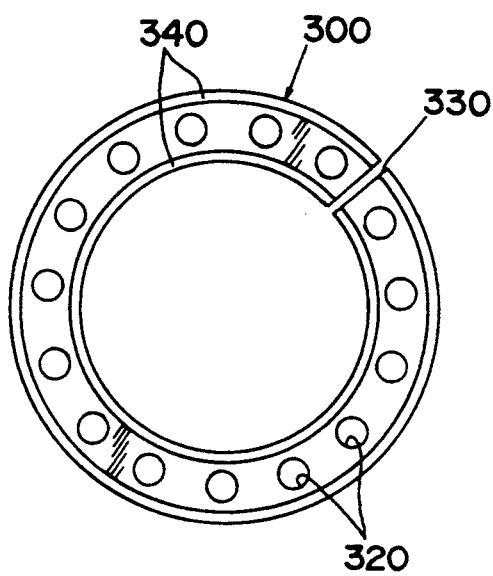
FIG. 11 is a front view of a ring nut of the same.
Figure 12:
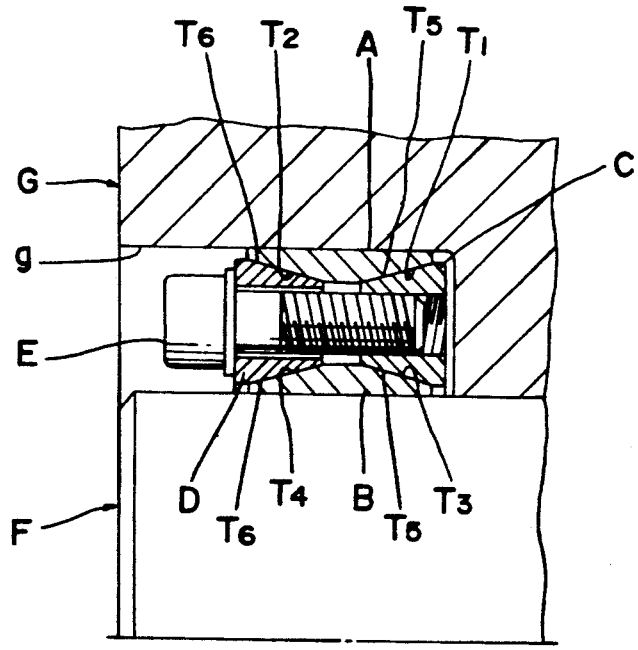
FIG. 12 is a sectional view of an example of the conventional coupling fixture.

Also, in the coupling fixture of the above-mentioned structure, as seen from FIGS. 8, 9 and 11, the ring nut 300 is cut at a circumferential position in the radial direction so as to form a cut 300 for making the ring nut 300 radially displaceable.

In a case where the coupling fixture is used to couple the gear 7 with the shaft 6, even when the shaft 6 or gear 7 has manufacturing error, for example, the shaft 6 is smaller in diameter than a predetermined size as the same as the above-mentioned, the ring nut 300 is moved axially inwardly of the outer and inner rings 100 and 200 as the screw bolts 500 are screwably tightened. Hence, at first, the outer ring 100 is expanded in diameter so as to be brought into press-contact with the gear 7 and thereafter the screw bolts 500 continue screwable tightening thereof whereby the ring nut 300 having the cut 330 is displaced radially inwardly on the basis of the outer ring 100 to thereby be contracted in diameter. Hence, the inner ring 200 is subjected to the urging force caused by the above-mentioned contraction in diameter and is contracted in diameter so as to be brought into press-contact with the shaft 6. Accordingly, the gear 7 can stably and rigidly be coupled with the shaft 6 without producing a difference in the urging force between the outer and inner rings 100 and 200.

Furthermore, in the coupling fixtures of the first and second embodiments, it is preferable to form axially extending splines 14 and 140 and 24 and 240 on the entire outer peripheries of the outer rings 1 and 100 and the entire inner peripheries of the inner rings 2 and 200 respectively. Thus, when the outer ring 1 or 100 and the inner ring 2 or 200 are interposed between the cutout 71 of gear 7 and the shaft 6, so that the outer ring 1 or 100 is expanded in diameter and the inner ring 2 or 200 is contracted in diameter to couple the gear 7 with the shaft 6, the splines 14 or 140 on the inner ring 1 or 100 are brought into press-contact with the inner surface of cutout 71 in an encroaching manner, and those 24 and 240 at the inner ring 2 or 200 similarly with the outer periphery of the shaft 6, thereby reliably preventing the outer ring and inner ring 1 or 100 and 2 or 200 from slipping with respect to the gear 7 or the shaft 6 respectively.

As above-mentioned, in the coupling fixture of the invention, a cut 33 or 330 is formed in the ring nut 3 or 300 interposed between the outer ring 1 or 100 and the inner ring 2 or 200, so that even when there is a manufacturing error in the gear 7 or shaft 6 to be coupled to each other, the ring nut 3 or 300 is radially displaceable, in other words, contracted in diameter. Hence, in comparison with the conventional example in which the outer and inner rings are merely axially moved, the outer ring 1 or 100 and inner ring 2 or 200 can reliably be brought into press-contact with the gear 7 and shaft 6, thereby enabling the gear 7 and shaft 6 to be rigidly and stably coupled with each other.

Also, splines 14 or 140 formed on the outer periphery of outer ring 1 or 100 and those 24 or 240 formed at the inner periphery of inner ring 2 or 200 can reliably prevent the outer ring 1 or 100 and inner ring 2 or 200 from slipping with respect to the gear 7 or the shaft 6, thereby enabling the gear 7 and shaft 6 to be rigidly coupled with each other.

Although several embodiments have been described, they are merely exemplary of the invention and not to be constructed as limiting, the invention being defined solely by the appended claims.

What is claimed is:

1. A coupling fixture for fixing a coupled member mainly to a shaft member, said fixture comprising:
   a) an outer ring having an inner peripheral surface and an outer peripheral surface and provided with a tapered surface at the inner peripheral surface, said outer ring having a generally radially extending cut therethrough;
   b) an inner ring having an inner peripheral surface and an outer peripheral surface and provided with a tapered surface at the outer peripheral surface, said inner ring having a generally radially extending cut therethrough;
   c) a wedge-like-shaped ring nut wedged into a space between the inner peripheral surface of said outer ring and the outer peripheral surface of said inner ring and having tapered surfaces abutting against said tapered surfaces respectively and a plurality of threaded bores circumferentially disposed therein; and
   d) screw bolts screwable into said threaded bores of said ring nut so as to allow said ring nut to wedge into the space between the inner peripheral surface of said outer ring and the outer peripheral surface of said inner ring, thereby expanding said outer ring in diameter and contracting said inner ring in diameter;

said coupling fixture being characterized in that
   e) said ring nut is radially cut to have an open gap at a circumferential part thereof, said gap creating circumferential edges on said ring nut being directly adjacent one another such that said circumferential edges are capable of coming into contact when said ring nut is contracted radially inwardly, so that in a case where the ring nut is wedged into said space between the outer ring and the inner ring and one of the outer and inner rings is sufficiently pressed against a corresponding coupled member while the other of the outer and inner rings is insufficiently pressed against a corresponding coupled member, said gap allows the ring nut to move along the tapered peripheral surface of said sufficiently pressed ring to be further wedged into the space between the outer and inner rings so as to be displaced radially outwardly or inwardly based on the tapered peripheral surface of said sufficiently pressed ring.

2. A coupling fixture according to claim 1, wherein splines are provided on the outer peripheral surface of said outer ring and on the inner peripheral surface of said inner ring.

* * * * *